(12) United States Patent
Wang et al.

(10) Patent No.: US 10,261,901 B2
(45) Date of Patent: Apr. 16, 2019

(54) METHOD AND APPARATUS FOR UNNEEDED BLOCK PREDICTION IN A COMPUTING SYSTEM HAVING A LAST LEVEL CACHE AND A MULTI-LEVEL SYSTEM MEMORY

(71) Applicant: INTEL CORPORATION, Santa Clara, CA (US)

(72) Inventors: Zhe Wang, Hillsboro, OR (US); Christopher B. Wilkerson, Portland, OR (US); Zeshan A. Chishti, Hillsboro, OR (US); Seth H. Pugsley, Salt Lake City, UT (US); Alaa R. Alameldeen, Hillsboro, OR (US); Shih-Lien L. Lu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 14/865,617

(22) Filed: Sep. 25, 2015

(65) Prior Publication Data
US 2017/0091093 A1  Mar. 30, 2017

(51) Int. Cl.
| G06F 12/00 | (2006.01) |
| G06F 12/0811 | (2016.01) |
| G06F 3/06 | (2006.01) |
| G06F 12/0862 | (2016.01) |
| G06F 12/0888 | (2016.01) |

(Continued)

(52) U.S. Cl.
CPC .......... *G06F 12/0811* (2013.01); *G06F 3/065* (2013.01); *G06F 3/0619* (2013.01); *G06F 3/0685* (2013.01); *G06F 12/0862* (2013.01); *G06F 12/0888* (2013.01); *G06F 12/0893* (2013.01); *G06F 2212/283* (2013.01);
(Continued)

(58) Field of Classification Search
CPC ............. G06F 12/0811; G06F 12/0862; G06F 3/0619; G06F 3/065; G06F 3/0685; G06F 2212/283; G06F 2212/6026
See application file for complete search history.

(56) References Cited

U.S. PATENT DOCUMENTS 5,829,025 A * 10/1998 Mittal ................. G06F 9/30047
711/122
5,912,839 A 6/1999 Ovshinsky et al.
(Continued)

FOREIGN PATENT DOCUMENTS

| EP | 2204741 A1 | 7/2010 |
| WO | 2003040916 A1 | 5/2003 |

OTHER PUBLICATIONS

Lee et al, "Architecting Phase Change Memory as a Scalable DRAM Alternative", ISCA '09, Jun. 20, 2009, 12 pgs., Austin, Texas, USA.
(Continued)

*Primary Examiner* — Mark A Giardino, Jr.
(74) *Attorney, Agent, or Firm* — Compass IP Law PC

(57) ABSTRACT

An apparatus is described. The apparatus includes a last level cache and a memory controller to interface to a multi-level system memory. The multi-level system memory has a caching level. The apparatus includes a first prediction unit to predict unneeded blocks in the last level cache. The apparatus includes a second prediction unit to predict unneeded blocks in the caching level of the multi-level system memory.

17 Claims, 6 Drawing Sheets

(51) Int. Cl.
*G06F 12/0893* (2016.01)
*G06F 13/00* (2006.01)
*G06F 13/28* (2006.01)

(52) U.S. Cl.
CPC ............... *G06F 2212/6026* (2013.01); *G06F 2212/7202* (2013.01)

(56) References Cited

U.S. PATENT DOCUMENTS

| | | | |
|---|---|---|---|
| 6,415,377 B1* | 7/2002 | Van Der Wolf | G06F 9/3455 710/52 |
| 6,662,273 B1 | 12/2003 | Wilkerson et al. | |
| 6,728,835 B1* | 4/2004 | Bauman | G06F 12/0897 711/122 |
| 6,760,816 B1 | 7/2004 | Ju et al. | |
| 6,779,108 B2 | 8/2004 | Ju et al. | |
| 6,785,797 B2 | 8/2004 | Wong et al. | |
| 6,931,490 B2 | 8/2005 | Wong et al. | |
| 7,114,059 B2 | 9/2006 | Wilkerson | |
| 7,228,388 B2* | 6/2007 | Hu | G06F 12/0897 711/122 |
| 7,590,918 B2 | 9/2009 | Parkinson | |
| 7,596,662 B2* | 9/2009 | Makineni | G06F 12/128 711/122 |
| 7,600,078 B1 | 10/2009 | Cen et al. | |
| 7,756,053 B2 | 7/2010 | Thomas et al. | |
| 7,865,669 B2* | 1/2011 | Kornegay | G06F 12/0888 711/117 |
| 7,913,147 B2 | 3/2011 | Swaminathan et al. | |
| 8,051,253 B2 | 11/2011 | Okin et al. | |
| 8,462,537 B2 | 6/2013 | Karpov et al. | |
| 8,462,577 B2 | 6/2013 | Zeng et al. | |
| 8,463,948 B1 | 6/2013 | Qawami et al. | |
| 8,612,676 B2 | 6/2013 | Dahlen et al. | |
| 8,605,531 B2 | 12/2013 | Kau et al. | |
| 8,607,089 B2 | 12/2013 | Qawami et al. | |
| 8,612,809 B2 | 12/2013 | Casper et al. | |
| 8,649,212 B2 | 2/2014 | Kau et al. | |
| 8,683,139 B2* | 3/2014 | Gaither | G06F 12/0888 711/138 |
| 8,838,935 B2 | 9/2014 | Hinton | |
| 9,087,584 B2 | 7/2015 | Dahlen et al. | |
| 9,298,606 B2 | 3/2016 | Ramanujan | |
| 9,317,429 B2 | 4/2016 | Ramanujan et al. | |
| 9,342,453 B2 | 5/2016 | Nale et al. | |
| 9,378,133 B2 | 6/2016 | Nachimuthu et al. | |
| 9,430,372 B2 | 8/2016 | Nachimuthu et al. | |
| 9,690,493 B2 | 6/2017 | Dahlen et al. | |
| 2005/0268046 A1 | 12/2005 | Heil | |
| 2006/0149904 A1 | 7/2006 | Mowry | |
| 2007/0005922 A1 | 1/2007 | Swaninathan et al. | |
| 2008/0010414 A1* | 1/2008 | Kailas | G06F 12/126 711/133 |
| 2008/0016269 A1 | 1/2008 | Chow et al. | |
| 2008/0034148 A1 | 2/2008 | Gower | |
| 2008/0215816 A1 | 4/2008 | Emma et al. | |
| 2008/0270811 A1 | 10/2008 | Chow et al. | |
| 2009/0313416 A1 | 12/2009 | Nation | |
| 2010/0110748 A1 | 5/2010 | Best | |
| 2010/0131827 A1 | 5/2010 | Sokolov | |
| 2010/0291867 A1 | 11/2010 | Abdulla et al. | |
| 2010/0293317 A1 | 11/2010 | Confalonieri et al. | |
| 2010/0306446 A1 | 12/2010 | Villa et al. | |
| 2010/0306453 A1 | 12/2010 | Doller | |
| 2010/0318718 A1 | 12/2010 | Eilert et al. | |
| 2011/0153916 A1 | 6/2011 | Chinnaswamy et al. | |
| 2011/0208900 A1 | 8/2011 | Schuette et al. | |
| 2011/0291884 A1 | 12/2011 | Oh et al. | |
| 2012/0159073 A1 | 6/2012 | Jaleel et al. | |
| 2012/0324142 A1 | 12/2012 | Boyle et al. | |
| 2013/0166846 A1 | 6/2013 | Gaur et al. | |
| 2013/0268728 A1 | 10/2013 | Ramanujan et al. | |
| 2013/0275661 A1 | 10/2013 | Zimmer et al. | |
| 2013/0290597 A1 | 10/2013 | Faber | |
| 2014/0129767 A1 | 5/2014 | Ramanujan et al. | |
| 2014/0297938 A1 | 10/2014 | Puthiyedath et al. | |
| 2015/0015555 A1 | 1/2015 | Wilkerson | |
| 2015/0026413 A1 | 1/2015 | Meir et al. | |
| 2015/0118756 A1 | 4/2015 | Pollack et al. | |
| 2015/0118766 A1 | 4/2015 | Pollack et al. | |

OTHER PUBLICATIONS

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al, "Onyx: A Prototype Phase Change Memory Storage Array",www.flashmemorysummit.com/.../ Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", Micro 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 30, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Ohen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

Wu, et al., "eNVy: A Non-Volatile, Main Memory Storage System" 1994 ACM., ASPLOS VI. pp. 86-97.

Dhiman, et al. "PDRAM: A Hybrid PRAM and DRAM Main Memory System", Jul. 26, 2009, Department of Computer Science and Engineering, 6 pages.

Khan, Samira, et al. "Sampling Dead Block Prediction for Last-Level_ Caches", Proceedings of the 43rd Annual IEEE/ACM International Symposium on Microarchitecture (MICRO-43), Dec. 2010, 12 pages.

Notification of the Transmittal of the International Search Report and the Written Opinion for related PCT/US2016/043000, dated Oct. 14, 2016, 14 pages.

Gaur, J, et al., "Bypass and Insertion Algorithms for Exclusive Last-Level Caches", International Symposium on Computer Architecture (ISCA), Jun. 6, 2011, 18 pages.

(56) References Cited

OTHER PUBLICATIONS

Lee, C.J., et al., "Dram-Aware Last-Level Cache Wiritback: Redcing Write=Caused Interference in Memory Systems", University of Texas, Austin, TR-HPS-2010-002, Apr. 2010, 21 pages.
S. Gupta, et al., "Adaptive Cache Bypassing for Inclusive Last Level Caches," 2013 IEEE 27th International Symposium on Parallel and Distributed Processing, Boston, MA, 2013, pp. 1243-1253.

* cited by examiner

METHOD AND APPARATUS FOR UNNEEDED BLOCK PREDICTION IN A COMPUTING SYSTEM HAVING A LAST LEVEL CACHE AND A MULTI-LEVEL SYSTEM MEMORY

FIELD OF INVENTION

The field of invention pertains generally to the computing sciences, and, more specifically, to cache memory management.

BACKGROUND

FIG. 1 depicts a traditional CPU complex 101 and system memory complex 102 for a multi-core processor 100. The processor or "host" side of the system memory complex 102 includes a memory controller 103 that interfaces with a system memory 104. As is understood in the art, the individual processing cores 101_1 through 101_N of a multi-core processor will snoop their internal caches (not shown) for the program and data needed by their respective threads. If an item of program code or data desired by a processing core thread is not found in the core's cache, the program code or data item may ultimately be fetched from system memory 104 by the memory controller 103.

The processing cores 101_1 through 101_N are interconnected by an interconnection network 105 (e.g., mesh network, front side bus, etc.) that is coupled to a last level cache 106. A last level cache 106, typically, caches program code and data for all the cores 101_1 through 101_N of the processor 100 rather than any particular core. A last level cache 106 is typically the last cache that is snooped for a desired item of program code or data before fetching the item from system memory 104 through the memory controller 103.

A system's performance may become inefficient if cacheable items are entered into a cache, such as the LLC 106, and then never called upon until eventually being evicted out the cache.

BRIEF DESCRIPTION OF THE DRAWINGS

A better understanding of the present invention can be obtained from the following detailed description in conjunction with the following drawings, in which.

DETAILED DESCRIPTION

Figure 1:
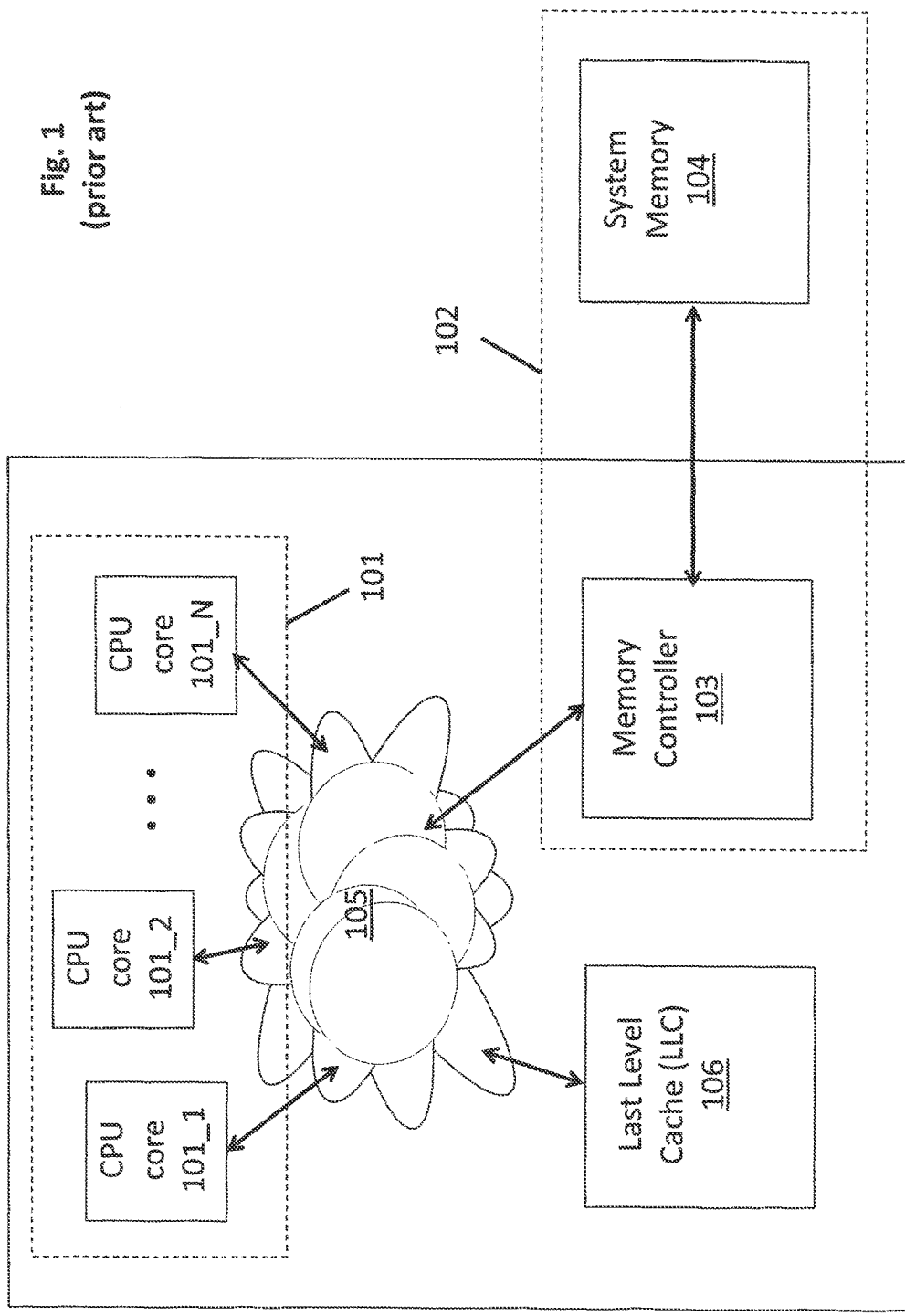
FIG. 1 shows a computing system having a last level cache.
Figure 2:
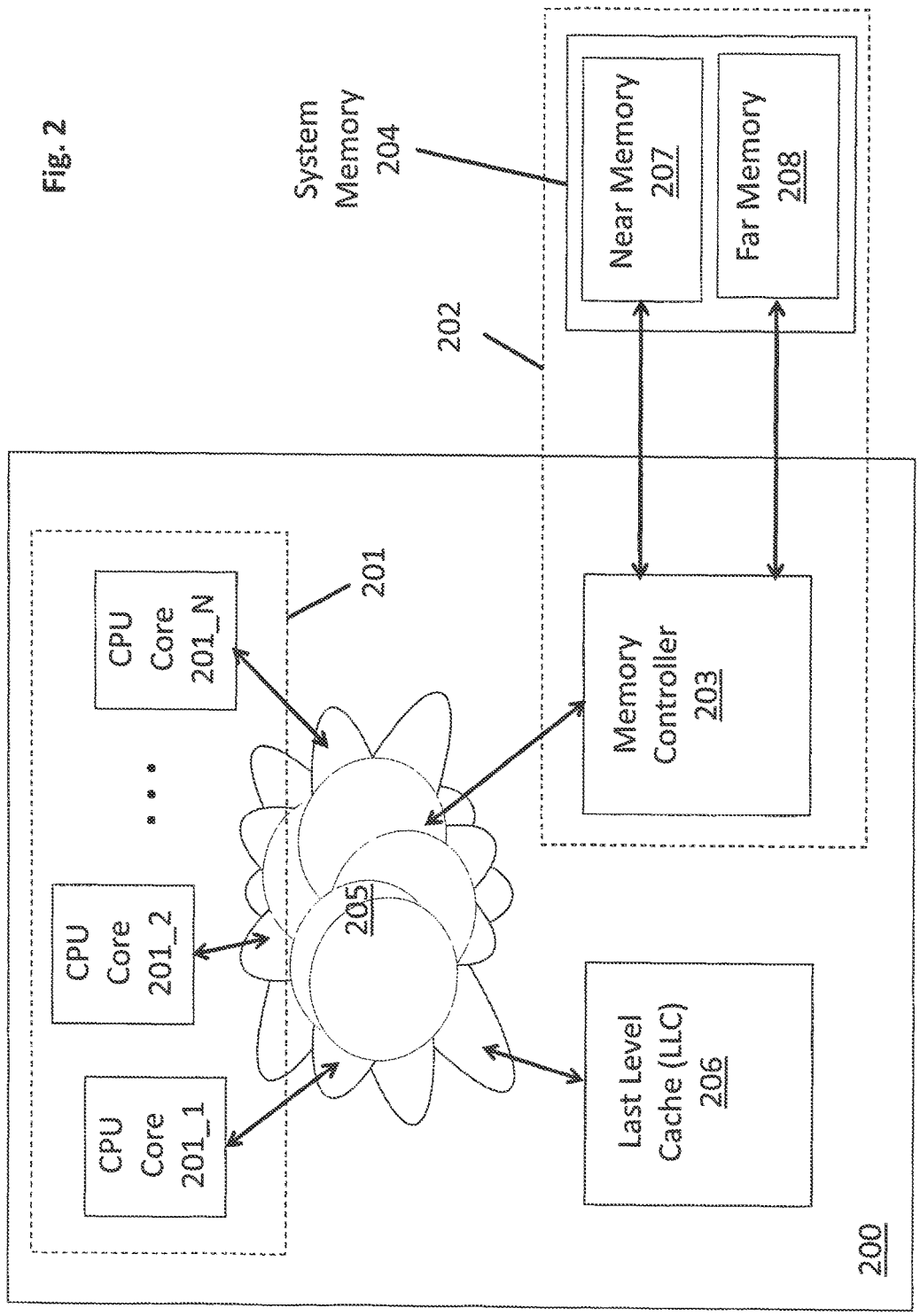
FIG. 2 shows a computing system having a multi-level system memory.

FIG. 2 shows an embodiment of a system having a multi-tiered or multi-level system memory 204. According to various embodiments, a near memory 207 may be utilized as a cache. In the case where near memory 207 is used as a cache, near memory 207 is used to store data items that are expected to be more frequently called upon by the computing system. In some cases, the near memory cache 207 has lower access times than the lower tiered far memory 208 region. By storing the more frequently called upon items in near memory 207, the system memory 204 will be observed as faster because the system will often read items that are being stored in near memory 207.

According to some embodiments, for example, the near memory 207 exhibits reduced access times by having a faster clock speed than the far memory 208. Here, the near memory 207 may be a faster, volatile system memory technology (e.g., high performance dynamic random access memory (DRAM)). By contrast, far memory 208 may be either a volatile memory technology implemented with a slower clock speed (e.g., a DRAM component that receives a slower clock) or, e.g., a non volatile memory technology that is inherently slower than volatile/DRAM memory.

For example, far memory 208 may be comprised of an emerging non volatile byte addressable random access memory technology such as, to name a few possibilities, a phase change based memory, a ferro-electric based memory (e.g., FRAM), a magnetic based memory (e.g., MRAM), a spin transfer torque based memory (e.g., STT-RAM), a resistor based memory (e.g., ReRAM) or a "Memristor" based memory, universal memory, Ge2Sb2Te5 memory, programmable metallization cell memory, amorphous cell memory, Ovshinsky memory, dielectric memory, etc.

Such emerging non volatile random access memories technologies typically have some combination of the following: 1) higher storage densities than DRAM (e.g., by being constructed in three-dimensional (3D) circuit structures (e.g., a crosspoint 3D circuit structure); 2) lower power consumption densities than DRAM (e.g., because they do not need refreshing); and/or 3) access latency that is slower than DRAM yet still faster than traditional non-volatile memory technologies such as FLASH. The latter characteristic in particular permits an emerging non volatile memory technology to be used in a main system memory role rather than a traditional storage role (which is the traditional architectural location of non volatile storage).

Regardless of whether far memory 208 is composed of a volatile or non volatile memory technology, in various embodiments far memory 208 acts as a true system memory in that it supports finer grained data accesses (e.g., cache lines) rather than larger "sector" based accesses associated with traditional, non volatile mass storage (e.g., solid state drive (SSD), hard disk drive (HDD)), and/or, otherwise acts as an (e.g., byte) addressable memory that the program code being executed by processing cores operate out of.

Because near memory 207 acts as a cache, near memory 207 may not have its own individual addressing space. Rather, in some cases, only far memory 208 includes the individually addressable memory space of the computing system's main memory. In various embodiments near memory 207 acts as a cache for far memory 208 rather than acting as a last level CPU cache. Generally, a last level cache, such as last level cache 206, is able to keep cache lines, or more generally, "blocks" across the entirety of system memory addressing space that is made available to the processing cores 201_1 through 201_N that are integrated on a same semiconductor chip as the memory controller 203.

Traditionally, computing systems have used a cache line as a unit of cacheable information. A cache line is typically smaller than the unit of data at which a traditional non volatile storage device (e.g., HDD or SSD) stores data (e.g., a "sector"). Various machines may also choose to cache information in near memory or processor level cache as more than one cache line (e.g., a super-line). A "block" as used herein refers to a cacheable unit of information and therefore may refer to a cache line or a super-line, or other sizes of information.

In various embodiments, system memory 204 is implemented with dual in-line memory module (DIMM) cards where a single DIMM card has both DRAM and (e.g., emerging) non volatile memory chips disposed in it. The DRAM chips effectively act as an on board cache for the non volatile memory chips on the DIMM card. Ideally, the more frequently accessed blocks of any particular DIMM card will be found on that DIMM card's DRAM chips rather than its non volatile memory chips. Given that multiple DIMM cards are typically plugged into a working computing system and each DIMM card is only given a section of the system memory addresses made available to the processing cores 201_1 through 201_N of the semiconductor chip 200 that the DIMM cards are coupled to, the DRAM chips are acting as a cache for the non volatile memory that they share a DIMM card with rather than a last level CPU cache. That is, the DRAM chips of near memory 207 may act as a memory side cache.

In other memory side cache configurations, DIMM cards having only DRAM chips may be plugged into a same system memory channel (e.g., a DDR channel) with DIMM cards having only non volatile system memory chips. Ideally, the more frequently used blocks of the channel will be found in the DRAM DIMM cards rather than the non volatile memory DIMM cards. Thus, again, because there are typically multiple memory channels coupled to a same semiconductor chip 200 having multiple processing cores 201_1 through 201_N, the DRAM chips are acting as a memory side cache for the non volatile memory chips that they share a same channel with—rather than acting as a last level CPU cache.

Although the above example referred to packaging solutions that included DIMM cards, it is pertinent to note that this is just one example and other embodiments may use other packaging solutions (e.g., stacked chip technology, one or more DRAM and phase change memories integrated on a same semiconductor die or at least within a same package as the processing core(s) 201_1 through 201_N, etc.) to effect a memory side cache.

In yet other embodiments, near memory 207, or at least a portion of it, may act as a CPU level cache, or, may be given system addressing space so as to behave as a faster/higher priority region of addressable system memory.

In implementations where near memory 207 acts as a cache, the architecture of the near memory cache 207 may also vary among embodiments. According to one approach, the near memory cache 207 is implemented as a direct mapped cache in which multiple system memory addresses map to one slot in near memory 207. Other embodiments may implement other types of cache structures (e.g., set associative, etc.).

Regardless of the specific cache architecture, different blocks may compete for the same cache resources in near memory 207. For example, in the case of a direct mapped cache, when requests for two or more blocks whose respective addresses map to the same near memory 207 slot are concurrently received by the memory controller 203, the memory controller 203 will keep one of the blocks in near memory cache 203 and cause the other block to be kept in far memory 204.

Whenever a request for a block is received by the memory controller 203, the memory controller 203 first checks for the block in near memory cache 207. If the result is a cache hit, the memory controller 203 services the request from the version of the block in near memory 207. In the case of a read request, the version of the block in near memory cache 207 is forwarded to the requestor. In the case of a write request, the version of the block in near memory cache 203 is written over and kept in the near memory cache 207. In the case of a cache miss, for both read and write requests, the block that is targeted by the request is called up from far memory 208 and stored in near memory cache 207. In order to make room for the new block in near memory cache 207, another block that competes with the targeted block is evicted from near memory cache 207 and sent to far memory 208.

According to one approach, the memory controller 203 maintains a tag cache or other local set of information that identifies what blocks are in near memory 207. By locally tracking within the memory controller 203 which blocks are kept in near memory 207, the memory controller 203 does not have to actually access near memory 207 to determine whether a cache hit or cache miss has occurred for a particular request. Other embodiments may not include such local information within the memory controller 203. In these embodiments, the memory controller 203 may physically access near memory 207 in order to determine cache hit/miss status for a request.

A system inefficiency associated with any caching system, as mentioned in the Background, is the existence of an unneeded block. An unneeded block can be a cached item that is not called upon after it is stored in a cache. The presence of an unneeded block in a cache essentially consumes space in the cache that might otherwise have been occupied by an item that the system actually needed and could have benefited from if it where in the cache (but for the unneeded block). With respect to systems having an LLC and a multi level system memory where one level, e.g., near memory, is a cache, unneeded blocks may exist both within the LLC and in the near memory cache.

Figure 3:
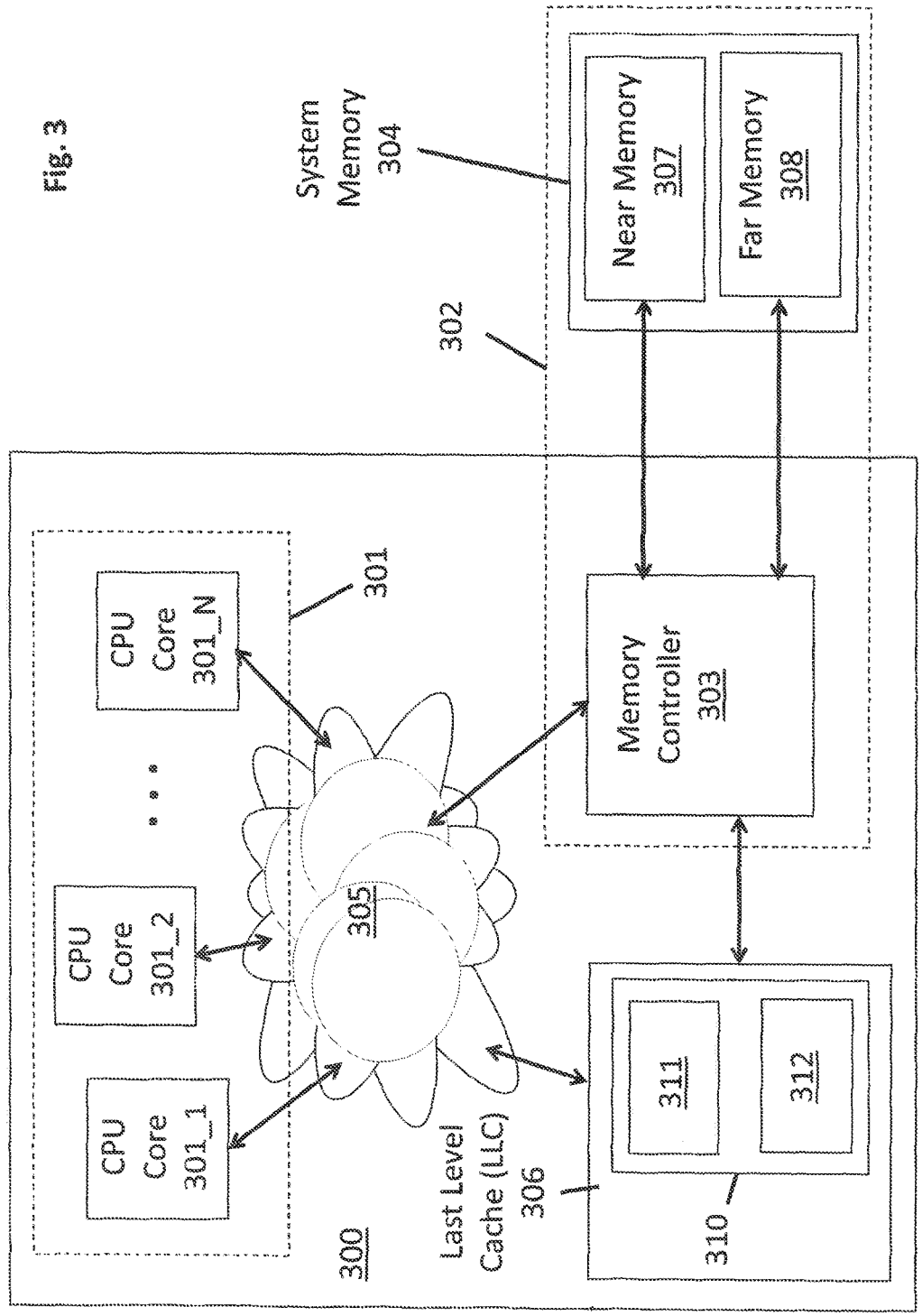
FIG. 3 shows a computing system having a multi-level system memory and prediction circuitry.

FIG. 3 shows a high level view of a computing system 300 that attempts to avoid caching unneeded blocks in both the LLC 306 and near memory cache 307 by identifying beforehand those blocks that will likely be unneeded blocks if they were to be entered into the LLC 306 and identifying those blocks beforehand that will likely be unneeded blocks if they were to be entered into near memory cache 307. The system 300 then refuses to enter any such identified blocks into the caching level (LLC 306 or near memory cache 307) that they have been identified as being a potential unneeded block within.

As observed in FIG. 3, the system 300 includes a two level prediction unit 310. The prediction unit 310 takes samples of blocks that are cached in the LLC 306 and implements two separate instances of prediction logic 311, 312 that will indicate, for any block in the system, whether the block has a propensity to be an unneeded-block. The first instance of prediction logic 311 indicates whether a block has a propensity to be an unneeded-block in the LLC 306, and, the second instance of prediction logic 312 indicates whether a block has a propensity to be an unneeded-block within near memory cache 307. The system then acts accordingly for any block address that suffers a cache miss at either of the LLC 306 or the near memory cache 307. Although described as separate instances, prediction logic 311 and 312 can be part of a single instance or implementation.

Figure 4:
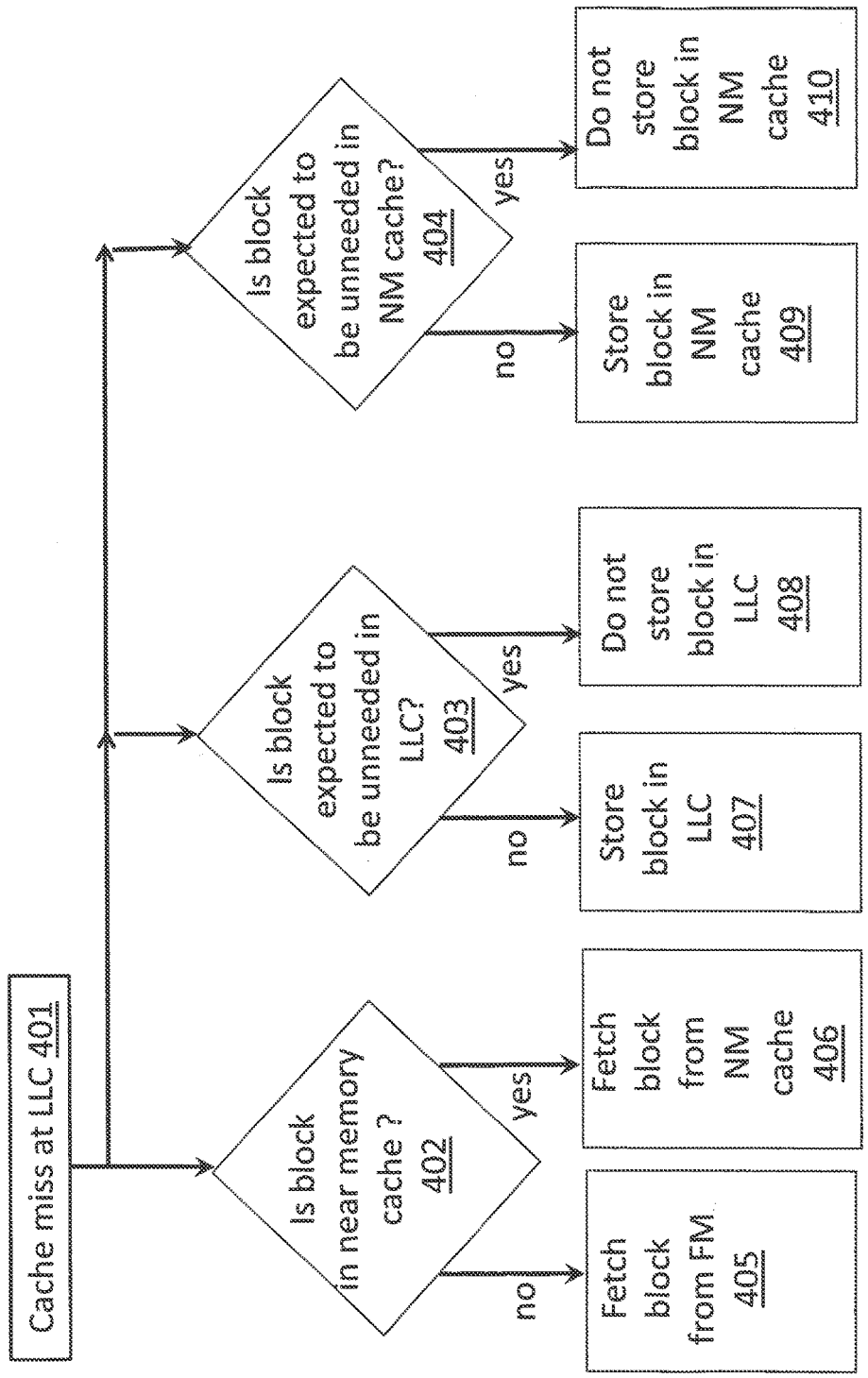
FIG. 4 shows a method performed by the system of FIG. 3.

For example, referring to FIGS. 3 and 4, if a request for a block is made at the LLC 306 and suffers a cache miss 401, the system 300 will next snoop 402 near memory cache 307 for the block. As another follow-on from the cache miss 401 at the LLC 306, the system will also refer 403 to the first (LLC) prediction unit 311 to see if the block has a propensity to be an unneeded block in the LLC, and, will also proceed to 404 for the second (near memory (NM) cache) prediction unit 312 to see if the block has a propensity to be an unneeded block in the near memory cache.

If the block is found in the near memory cache and has a propensity to be an unneeded block in the LLC, the block is fetched from near memory cache 406 and is provided to the requestor (e.g., the processor thread that made the request for the block). However, the block is not cached in the LLC 408. If the block is found in the near memory cache but does not have a propensity to be an unneeded block in the LLC, the block is fetched from near memory cache 406 and is provided to the requestor. A copy of the block is also entered into the LLC 407.

If the block is not found in near memory cache and has a propensity to be an unneeded block in both the LLC and the near memory cache, the block is called up from far memory 405 and is provided to the requestor. However, a copy of the block is not entered in the LLC 408 nor is a copy entered in the near memory cache 410. If the block is not found in near memory cache and has a propensity to be an unneeded block in the LLC but not near memory cache, the block is fetched from far memory 405 and is provided to the requestor. In this case, a copy of the block is entered into the near memory cache 409 but not the LLC 408.

If the block is not found in near memory cache and does not have a propensity to be an unneeded block in the LLC but has a propensity to be an unneeded block in the near memory cache, the block is called up from far memory 405 and is provided to the requestor as before. In this case, a copy of the block is entered in the LLC 407 but no copy of the block is placed in near memory 410. Lastly, if the block is not found in near memory cache and does not have a propensity to be an unneeded block in both the LLC and near memory cache, the block is fetched from far memory 405 and is provided to the requestor. In this case, copies of the block are also entered in both the LLC 407 and the near memory cache 409. Note that in cases where the block is found in near memory cache but is predicted to be an unneeded block in near memory cache the system can be designed to either store the block in near memory cache, or, trust the prediction and evict the block to far memory.

Figure 5:
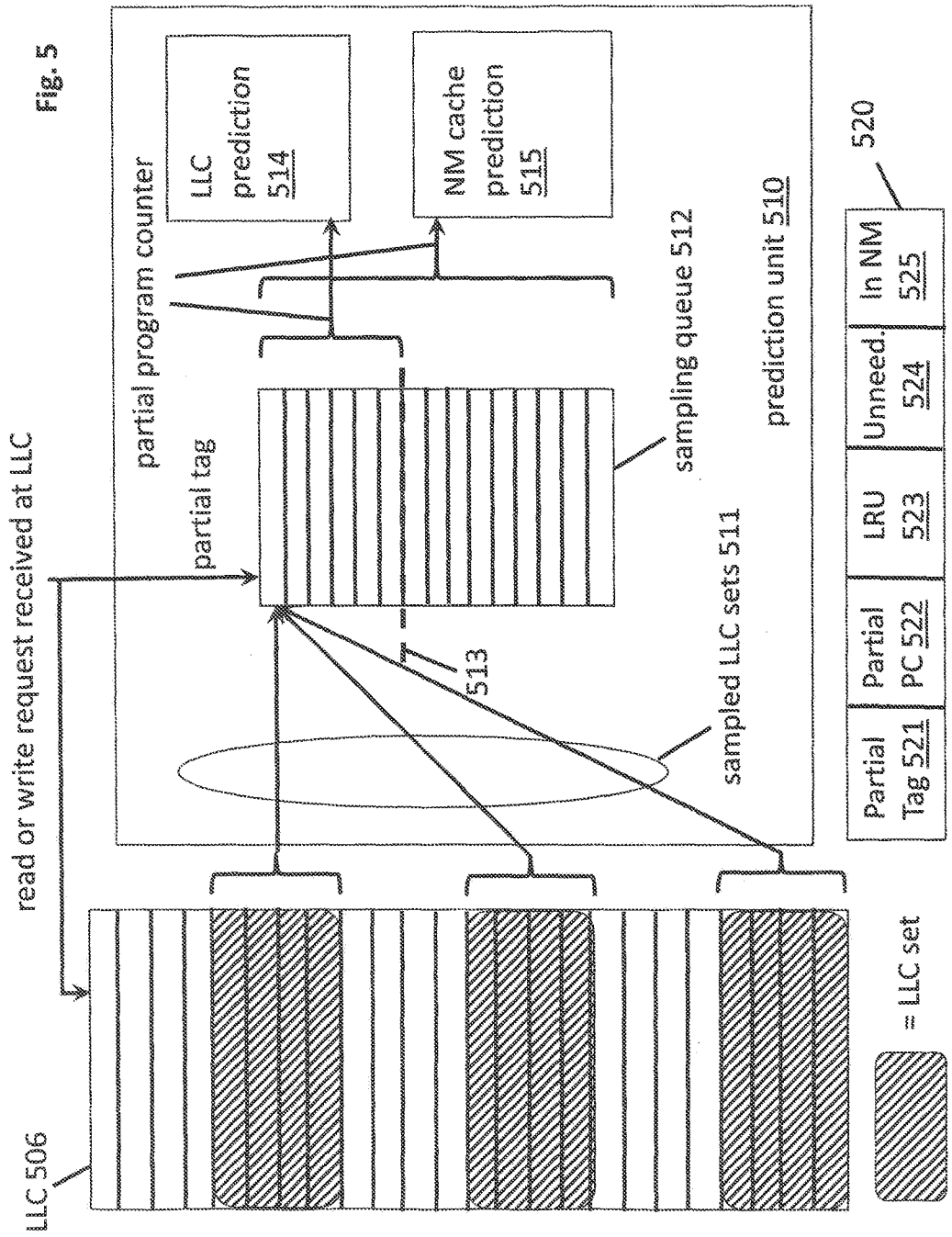
FIG. 5 show an embodiment of a prediction unit.

FIG. 5 shows an embodiment 510 of the two level prediction 310 unit of FIG. 3. The particular embodiment 510 of FIG. 5 depicts the prediction unit as being associated with the LLC 506. As described in more detail further below, other embodiments may choose to integrate the prediction unit differently.

In an embodiment, the LLC 506 is a set way associative cache in which each of the system memory addresses of the computing system map to a subset (or "set") of slots in the LLC 506. Multiple sets are included in the overall LLC 506. Which particular set a particular address will map to is determined by a hashing function (different addresses will map to a same set or a different set depending on the hashing function). The size of a set, i.e., its number of slots, is referred to as "way" (an address that maps to a set can map into the set N different ways).

As observed in FIG. 5, the prediction unit 510 samples the cached contents of a number of sets of the LLC 506. Inset 520 of FIG. 5 shows an embodiment of a special data structure that is created for each of the cached blocks of the LLC 506 that are sampled by the prediction unit 510. As observed in FIG. 5 the special data structure includes a partial tag field 521, a partial program counter (PC) field 522, an LRU bit field 523, an unneeded bit field 524 and an in near memory cache bit field 525.

In an embodiment, the partial tag field 521 includes lower ordered bits of the address tag of a block that has been entered into a slot of one of the LLC sets being sampled, and, the partial program counter field 522 corresponds to lower ordered bits of a program counter value associated with the block.

Here, as is known in the art, executing program code of a CPU core refers to a program counter to point to a specific location of the code thereby controlling the execution order of the code's corresponding instructions. In an embodiment, whenever the program code executes a memory access instruction, the program counter value at the moment the memory access instruction is executed is appended to the memory access request. The memory access request also includes the system memory address of the data to be fetched.

The memory access request is then directed toward system memory. As part of being directed toward system memory, the memory access request will first snoop various caching levels of the processor. If the desired data item is not found in a higher level cache, the memory access request will eventually snoop the LLC 506. If the address of the request hashes to a set that is being sampled, a partial tag is formed from the lower ordered bits of the request's tag. A tag, as is known in the art, is a section of the request's system memory address.

The partial tag from the incoming request is then used to snoop a sampling queue 512 which has data structures formatted according to inset 520 from cached blocks that are sampled from the LLC 506. If a data structure is found in the sampling queue 512 having the same partial tag as the incoming request, the partial program counter value of the data structure found in the sampling queue 512 is forwarded to one or both of the LLC and near memory prediction units 514, 515 depending on the position in the sampling queue 512 where the matching data structure was found. More specifically, in an embodiment, if the matching entry found in the sampling queue 512 is located above a demarcation line 513, then the partial program counter value of the entry is forwarded to both the LLC and near memory prediction units 514, 515. By contrast, if the matching entry found in the sampling queue 512 is located beneath the demarcation line 513, then the partial program counter value of the entry is only forwarded to the near memory prediction unit 515.

Here, after the partial program counter value of a matching entry in the sampling queue 512 is forwarded to one or both of the prediction logic units 514, 515, the matching entry will be moved to the top of the sampling queue 512 and the partial program counter value from the memory access request that was received at the LLC (and triggered the original lookup into the sampling queue 512) is written over the older pre-existing partial program counter value that was just forwarded to one or both of the prediction units 514, 515.

Here, sampling queue entries that frequently receive hits from incoming read or write requests to the LLC will have a tendency to be moved up toward the top of the queue 512 making the blocks that these entries correspond to more likely to be found in the LLC 506 rather than near memory cache. As such, predictions from these entries are made with the LLC prediction unit 514. Because the blocks such entries correspond to also have some probability of being in near memory cache as a sheer consequence of having a propensity for being in the LLC (they can be evicted to near memory cache), predictions are also made for these entries with the near memory cache prediction unit 515.

By contrast, entries of the sampling queue 510 that receive hits less frequently are apt to be positioned lower in the sampling queue 510. Entries that are receiving less frequent hits are therefore emblematic of blocks that have a propensity for being in near memory cache rather than the LCC (not receiving hits in the LLC, they are more apt to be evicted to near memory cache). As such, in the embodiment of FIG. 5, predictions for entries positioned lower in the sampling queue 510 are made with the near memory cache prediction unit 515.

In an embodiment, the demarcation line 513 that delineates which entries only affect the LLC prediction unit versus which entries can affect both prediction units 514, 515 can be set to roughly reflect the relative sizes of the LLC and the near memory cache. For example, in an embodiment where the sampling queue has 64 entries, the demarcation line 513 may be drawn between the $12^{th}$ and $13^{th}$ entries in the queue 512 if the near memory cache is roughly four times the size of the LLC 506.

After an entry's partial program counter value is forwarded to the appropriate prediction unit(s) based on its location in the queue 512, as mentioned above, the entry is moved to the top of the queue 512 and the partial counter value of the LLC request that originally triggered the lookup into the sampling queue 512 is written over the entry's previously existing partial counter value. In response to the entry being placed at the top of the queue, each of the other entries in the queue 512 move down in the sampling queue 512 and the sampling queue is ready to receive a next sampled LLC request for a look-up into the queue 512. If there is no match on a look-up, the lowest entry in the queue 512 is evicted from the queue 512 and an entire new entry built from the LLC request itself is entered into the top of the queue 512. That is, the new entry includes the partial tag and partial counter values from the original request.

In an embodiment, rather than using an actual physical queue, instead, a logical queue is constructed by tracking an LRU field 523 in each entry data structure. Here, a new entry or any entry whose partial tag matches a looked up partial tag is given an LRU value of 1 in the LRU field to effectively place the entry at the top of the logical queue (even though the entry has not physically moved in the sampling queue). The LRU field of all other entries in the sampling queue are then incremented by one to logically move each of these entries down one position in the logical queue (even though, again, no actual physical movement takes place).

Here, with the understanding that a logical queue can be constructed with the LRU field 523, in an embodiment, no actual separate circuitry exists to implement queue 512. Rather, the sampling queue 512 is realized simply by appending the data structure 520 of FIG. 5, including the LRU field 523, to the actual cached entries of the LLC 506 that are being sampled.

A look-up match on an entry having an LRU value 523 that is less than the demarcation line 513 causes the LLC and near memory cache prediction units 514, 515 to receive the matching entry's partial program counter value. By contrast, a look-up match on an entry having an LRU value 523 that is higher than the demarcation line 513 causes only the near memory cache prediction unit to receive the matching entry's partial program counter value.

Note that hits in the sampling queue 512 are based on matches on lower ordered address tag bits and predictions are based on lower ordered bits of program counter values. Here, the system is trying to identify those blocks that will not be called upon by the system once entered into one of the LLC or near memory caching levels.

Generally, executing program code performs loops or other flows in which correlations can be established from which a need for a data item can be assessed based on its relative position in system memory from the perspective of the executing code (which is reflected in the lower ordered bits of the data item's tag address value) and the relative position of the program code that calls upon the data item (which is reflected in the lower ordered bits of the program counter value). Here, a match on the lower ordered bits of the tag address provides an indication of a data item's likelihood to be entered in a cache while the lower ordered bits of a program counter value can be used to provide an indication whether or not the data item will be needed by the code once it has been cached. In alternate or combined embodiments, a prediction as to whether or not the data item will be needed after it is cached may be based on heuristics (e.g., cache line signature, page information, cache access type, or cache access history). As such, the partial program counter field 522 may be eliminated to instead include a parameter based on of one or more of such heuristics, or, may be combined with one or more heuristics to provide a parameter based on the program counter and one or more heuristics.

In an embodiment, both of the prediction units 514, 515 are implemented as a hash table that maps a partial program counter value to a particular saturation counter (different partial counter values will map to a same or different saturation counter depending on their values). A saturation counter does not rise above a certain value irrespective of how many consecutive increments it receives, and, not does not fall beneath a certain value irrespective of how many consecutive decrements it receives. For example, in one embodiment, the saturation counters are implemented as two bit saturation counters. As such, each counter can receive consecutive increments but will never rise above a value of 3 ("111"). Likewise, each counter can receive consecutive decrements but will never fall below a value of 0 ("000").

In an embodiment, a lower counter value corresponds to a propensity to not be an unneeded block while a higher counter value corresponds to a propensity to be an unneeded block. Counters of the LLC prediction unit 514 therefore provide indications for different partial program counter values as to whether or not their corresponding blocks are likely to be an unneeded block in the LLC. Likewise, counters of the near memory prediction unit 515 provide indications for different partial program counter values as to whether or not their corresponding blocks are likely to be an unneeded block in the near memory cache.

In an embodiment, after a hit in the queue causes a partial program counter value to be forwarded to a prediction unit and mapped to a saturation counter, the value of the mapped to saturation counter is decremented by 1 (−1) to reflect that this particular counter value is a counter value whose corresponding block is likely to be hit (i.e., not be an unneeded block) if it resides in the cache that the prediction unit corresponds to.

Additionally, in an embodiment, if an entry in the queue 512 falls below the demarcation line 513, the partial program counter value of the falling entry is forwarded to the LLC prediction logic 514 and mapped to its particular saturation counter. The particular counter, in turn, is incremented by 1 (+1) to indicate that a block that corresponds to this particular counter value is not being hit often enough in the LLC. As such, it is more likely to be an unneeded block in the LLC and its LLC prediction unit counter value is lowered.

Furthermore, in an embodiment, if an entry is evicted from the sampling queue (it fell to the lowest entry in the queue 512 and did not receive a hit before a next new entry was added to the queue 512), the partial program counter value for the evicted entry is directed to the near memory cache prediction logic 515 and mapped to its particular counter. The particular counter, in turn, is incremented by 1 (+1) to indicate that a block that corresponds to this particular counter value is not expected to be hit often enough in the near memory cache. As such, it is more likely to be an unneeded block in the near memory cache and it near memory prediction unit counter value is lowered.

Referring back to FIG. 4 then, upon a cache miss at the LLC 401, the partial program counter value for the block that has just missed the LLC is passed to both prediction units 514, 515. In response, both prediction units provide an indication whether the block that has just missed in the LLC is expected to be an unneeded block in the LLC 403 and whether the block is expected to be an unneeded block in the near memory cache 404.

Referring to FIGS. 3 and 5, the "in near memory" (In NM) bit 525 is used to track whether a particular block in the LLC has a copy of itself in the near memory cache. Upon eviction of the block from the LLC, the "in near memory" bit 525 information can be passed to the memory controller 303 along with the block being evicted. If the "in near memory" bit is set, the memory controller 303 can, e.g., perform a direct write into near memory 307 without performing a near memory cache lookup beforehand to confirm that the copy of the evicted block is there. Likewise, if the "in near memory" bit is not set, the memory controller 303 can write the evicted block directly to far memory 308—again without having to perform a near memory cache lookup to confirm that the copy of the block is not there.

The "in near memory" bit 525 can be set or unset in response to various data flows. Referring to FIG. 4, the in near memory bit will be set for sequences 408 and 410 but not sequences 407 and 409. In systems that prefetch data from system memory into LLC. Here, a prediction is made that certain data will be needed by executing program code and any such data existing in system memory is called up from system memory and entered into the LLC. Any such pre-fetched block that is found in near memory cache will have its corresponding "in near memory" bit 525 set upon its entry in the LLC. Likewise, any such pre-fetched block that was not found in near memory cache and was instead fetched from far memory will not have its "in near memory" bit 525 set upon its entry in the LLC. Here, in the case of pre-fetching anyways, pre-fetched data items that are retrieved from far memory are not placed in near memory cache as a consequence of their being fetched from far memory.

In cases where a block that is cached in near memory cache is evicted from near memory cache, the memory controller may forward notice of the eviction event to the LLC which, in turn, will reset the "in near memory" bit 525 for the block to indicate that the block is no longer in near memory cache.

The unneeded bit 524 indicates whether the corresponding block is considered an unneeded block by the near memory cache prediction unit 515. Recall that when an entry falls below the demarcation line 513 or is evicted from the sampling queue 512, the saturation counter within the near memory prediction unit 515 that the entry's partial program counter value maps to may be incremented. In an embodiment, if the increment causes the saturation counter value to rise to its maximum saturation value (e.g., "111"="3"), the entry's unneeded bit 524 is set. The setting of the unneeded bit means that the system has decided the block that the entry corresponds to is likely to be an unneeded block if it is to be entered in the near memory cache.

In an embodiment, each block is also tracked as to whether or not it is in a modified state (M) (e.g., with meta data that is attached to the block in the LLC 506). A block that is in a modified state has been written to at or above the LLC and therefore represents the most recent version of the data. As explained below, whether the block has a copy in near memory cache (as evidence by the in near memory bit 525), whether the block is deemed to be an unneeded block if it where to be entered in the near memory cache (as evidence by the unneeded bit 524), and whether the block is in an M state can affect how the block is handled upon eviction from the LLC. Here, the M state information, the in near memory bit 525 information and the unneeded bit 524 information can all be passed to the memory controller along with the evicted block so that the memory controller can affect varying treatment of the block based on the information.

Specifically, in an embodiment, a block in the M state that is evicted from the LLC 506 and has its in near memory bit 525 set will be written into near memory cache. Also, a block in the M state that is evicted from the LLC 506 and has its in near memory bit 525 unset and has its unneeded bit 524 set is not written into near memory cache but is instead written into far memory (near memory is bypassed).

In an embodiment, if a block that is not in the M state (i.e., it is not modified or is "clean") is evicted from the LLC and has its in near memory bit not set (a copy of the block is not in near memory), the memory controller can simply not take any action if there is a guaranteed copy in far memory (i.e., drop the block and not bother to write it into near memory cache or far memory). Otherwise, if there is no guaranteed copy in far memory, the memory controller can write the evicted block into far memory and bypass near memory cache. The same process can be performed for a clean block that has its unneeded bit set. By contrast, a clean block that has its in near memory cache bit not set and its unneeded bit not set can be written into near memory cache.

Referring back to FIG. 5, note that the prediction units 514, 515 were depicted as being logic units associated with the LLC (e.g., circuitry that is physically integrated with the LLC circuitry). In alternate embodiments, the values of the various saturation counters may be stored in near memory cache. Here, a memory (e.g., SRAM) structure may be integrated with the LLC circuitry and the counter values of the prediction units are called up from near memory as needed and written back to near memory when not needed.

Figure 6:
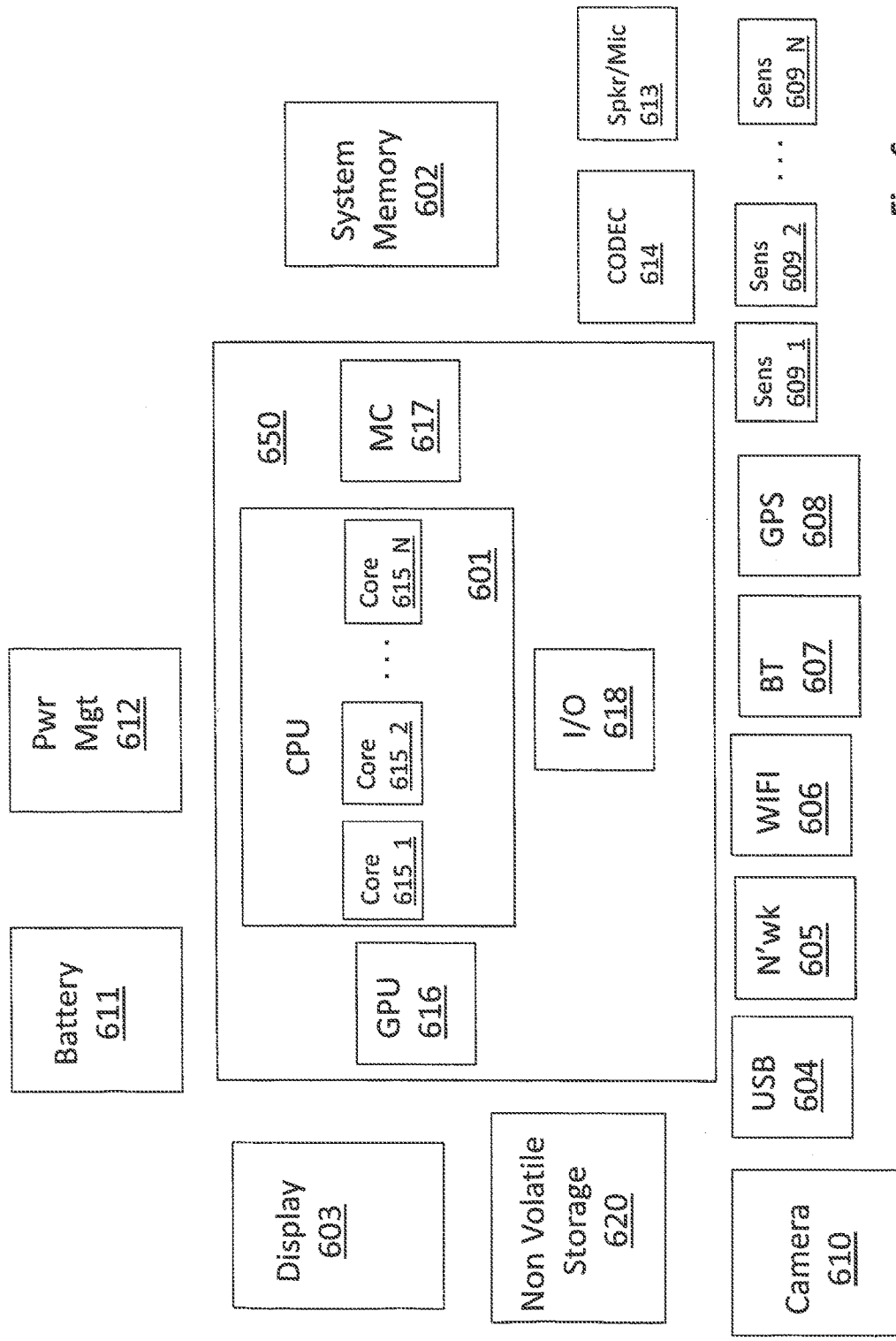
FIG. 6 shows an embodiment of computing system.

FIG. 6 shows a depiction of an exemplary computing system 600 such as a personal computing system (e.g., desktop or laptop) or a mobile or handheld computing system such as a tablet device or smartphone. As observed in FIG. 6, the basic computing system may include a central processing unit 601 (which may include, e.g., a plurality of general purpose processing cores and a main memory controller disposed on an applications processor or multi-core processor), system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_N (e.g., one or more of a gyroscope, an accelerometer, a magnetometer, a temperature sensor, a pressure sensor, a humidity sensor, etc.), a camera 610, a battery 611, a power management control unit 612, a speaker and microphone 613 and an audio coder/decoder 614. Any of sensors 601_1 through 609_N as well as the camera 610 may include neural network semiconductor chip circuitry having MTJ learning rule circuitry described above.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing units 616 typically execute graphics intensive functions to, e.g., generate graphics information that is presented on the display 603. The memory control function 617 interfaces with the system memory 602. The power management control unit 612 generally controls the power consumption of the system 600.

The system memory 602 may be a multi-level system memory. The computing system may also include a cache, such as a last level cache (not shown) and associated prediction circuitry as described at length above.

Each of the touchscreen display 603, the communication interfaces 604-607, the GPS interface 608, the sensors 609, the camera 610, and the speaker/microphone codec 613, 614 all can be viewed as various forms of I/O (input and/or output) relative to the overall computing system including, where appropriate, an integrated peripheral device as well (e.g., the camera 610). Depending on implementation, various ones of these I/O components may be integrated on the applications processor/multi-core processor 650 or may be located off the die or outside the package of the applications processor/multi-core processor 650.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
   a last level cache;
   a memory controller to interface to a multi-level system memory, the multi-level system memory having a caching level;
   a first prediction unit to predict unneeded blocks in the last level cache;
   first circuitry to:
      if a block in the last level cache is deemed to be unneeded in the last level cache by the first prediction unit, evict the block from the last level cache to the multi-level system memory; and/or,
      if a block that is deemed to be unneeded in the last level cache by the first prediction unit is in the multi-level system memory, prevent the block from being called up from the multi-level system memory and entered into the last level cache; and
   a second prediction unit to predict unneeded blocks in the caching level of the multi-level system memory, wherein, the first and second prediction units are to generate respective predictions based on samples of blocks in the last level cache, wherein the first prediction unit is to update its predictions from a smaller subset of the samples than the second prediction unit is to update its predictions from;
   second circuitry to:
      if a block in the caching level is deemed to be unneeded in the caching level by the second prediction unit, evict the block from the caching level; and/or,
      if a block that is deemed to be unneeded in the caching level by the second prediction unit is not in the caching level, prevent the block from being entered in the caching level.

2. The apparatus of claim 1 where the samples are to be queued in a queue.

3. The apparatus of claim 2 wherein the queue is a logical queue.

4. The apparatus of claim 1 wherein the samples have associated information that indicate any of:
   i) whether a sampled block has a copy stored in near memory cache;
   ii) whether a sampled block is predicted to be an unneeded block in near memory cache.

5. The apparatus of claim 4 wherein the memory controller is to access the multi-level system memory without a lookup of contents of the near memory cache based on the information i).

6. The apparatus of claim 1 wherein the first and second prediction units are to generate respective predictions based on samples of entries in the last level cache.

7. The apparatus of claim 6 wherein the block is not to be placed into the near memory cache if the second prediction unit predicts that the block will be an unneeded block in the near memory cache.

8. The apparatus of claim 1 wherein the memory controller is to not place a block, fetched from the multi-level system memory after a cache miss of the block at the last level cache, into the near memory cache if the second prediction unit predicts that the block will be an unneeded block in the near memory cache.

9. The apparatus of claim 1 wherein a block, fetched from the multi-level system memory after a cache miss of the block at the last level cache, is not be placed into the last level cache if the first prediction unit predicts that the block will be an unneeded block in the last level cache.

10. A method, comprising:
    missing a read or write request for a block at a last level cache;
    formulating a first prediction that specifies whether the block will be an unneeded block in the last level cache;
    formulating a second prediction that specifies whether the block will be an unneeded block in a caching level of a multi-level system memory wherein the first prediction is based on a smaller set of samples of the last level cache that the second prediction is based on;
    fetching the block from the multi-level system memory;
    deciding to place or not place the block in the last level cache based on the first prediction; and,
    deciding to place or not place the block in the caching level of the multi-level system memory based on the second prediction.

11. The method of claim 10 wherein the first and/or second predictions are based on heuristics.

12. The method of claim 10 further comprising increasing a second block's propensity to be an unneeded block in the caching level of the multi-level system memory if it falls out of the set of samples that the second prediction is based on.

13. The method of claim 10 wherein the first and/or second predictions are based on partial program counter values.

14. An apparatus, comprising:
    a plurality of general purpose processing cores;
    a multi-level system memory having a caching level;
    a networking interface communicatively coupled to at least one of the plurality of general purpose processing cores;
    a last level cache;
    a memory controller to interface to the multi-level system memory, the memory controller communicatively coupled to at least one of the plurality of general purpose processing cores;
    a first prediction unit to predict unneeded blocks in the last level cache;
    first circuitry to:
        if a block in the last level cache is deemed to be unneeded in the last level cache by the first prediction unit, evict the block from the last level cache to the multi-level system memory; and/or,
        if a block that is deemed to be unneeded in the last level cache by the first prediction unit is in the multi-level system memory, prevent the block from being called up from the multi-level system memory and entered into the last level cache; and,
    a second prediction unit to predict unneeded blocks in the caching level of the multi-level system memory, wherein, the first and second prediction units are to generate respective predictions based on samples of blocks in the last level cache, wherein the first prediction unit is to update its predictions from a smaller subset of the samples than the second prediction unit is to update its predictions from;
    second circuitry to:
        if a block in the caching level is deemed to be unneeded in the caching level by the second prediction unit, evict the block from the caching level; and/or,
        if a block that is deemed to be unneeded in the caching level by the second prediction unit is not in the caching level, prevent the block from being entered in the caching level.

15. The apparatus of claim 14 wherein the memory controller is to not place a block, fetched from the multi-level system memory after a cache miss of the block at the last level cache, into the near memory cache if the second prediction unit predicts that the block will be an unneeded block in the near memory cache.

16. The apparatus of claim 14 wherein a block, fetched from the multi-level system memory after a cache miss of the block at the last level cache, is not be placed into the last level cache if the first prediction unit predicts that the block will be an unneeded block in the last level cache.

17. The apparatus of claim 16 wherein the block is not to be placed into the near memory cache if the second prediction unit predicts that the block will be an unneeded block in the near memory cache.

* * * * *